United States Patent [19]

Volk, Jr.

[11] Patent Number: 4,742,463
[45] Date of Patent: May 3, 1988

[54] METHOD AND APPARATUS FOR A PELLET MILL CONTROLLER WITH DIE TEMPERATURE CONTROL

[75] Inventor: Joseph A. Volk, Jr., Creve Coeur, Mo.

[73] Assignee: Beta Raven Inc., Earth City, Mo.

[21] Appl. No.: 813,244

[22] Filed: Dec. 24, 1985

Related U.S. Application Data

[63] Continuation-in-part of Ser. No. 810,060, Dec. 17, 1985.

[51] Int. Cl.⁴ .............................................. G06F 15/46
[52] U.S. Cl. ...................................... 364/468; 99/487; 364/172; 364/557; 426/454
[58] Field of Search ............... 364/468, 469, 476, 477, 364/557; 137/2, 3; 99/486, 487, 488; 425/DIG. 230, 331; 426/454, 231, 512, 630, 635, 636; 241/34, 35

[56] References Cited

U.S. PATENT DOCUMENTS

| | | | |
|---|---|---|---|
| 3,932,736 | 1/1976 | Zarow et al. | 137/2 X |
| 3,978,236 | 8/1976 | Sair et al. | 426/656 X |
| 4,119,742 | 10/1978 | Stupec | 426/440 X |
| 4,340,937 | 7/1982 | Volk, Jr. | 364/468 |
| 4,424,016 | 1/1984 | Matsuda et al. | 425/162 X |
| 4,463,430 | 7/1984 | Volk, Jr. et al. | 364/188 X |

Primary Examiner—Joseph Ruggiero
Attorney, Agent, or Firm—Rogers, Howell, Moore & Haferkamp

[57] ABSTRACT

A non-contacting infrared temperature sensor is utilized in a control system for a pelleting apparatus to sense the temperature of the rotating die within the pellet mill and is used to control the moisture addition to control the pelleting process. A moisture meter is mounted to the cooler and automatically adjusts the desired die temperature in response to the moisture content of finished pellets.

69 Claims, 1 Drawing Sheet

METHOD AND APPARATUS FOR A PELLET MILL CONTROLLER WITH DIE TEMPERATURE CONTROL

This application is a continuation-in-part of Ser. No. 810,060, filed Dec. 17, 1985.

BACKGROUND AND SUMMARY OF THE INVENTION

The invention disclosed herein is an improvement to the inventor's prior automatic pellet mill controllers as disclosed and claimed in U.S. Pat. Nos. 3,932,736, 4,340,937 and 4,463,430, all of which were invented by the inventor herein and which are commonly owned by the assignee of the present invention. These prior patents are incorporated herein by reference.

The automatic pellet mill controllers disclosed in these prior patents essentially sense the temperature of the material as it is processed by the pelleting apparatus and at various points therealong, measures the difference between two of those sensed temperatures, and controls the operation of the pelleting apparatus by controlling the rate of addition of ingredients thereto. Of course, each of these systems has its own unique features and reference should be made directly to those prior patents for complete details of each system.

The temperature of the material is sensed at various points in the pelleting apparatus through the use of direct contact temperature sensors, such as 106 or 109 as shown in the '937 patent which requires direct physical contact between the material and the temperature sensor to achieve an accurate measurement thereof. In the prior art, temperature sensors are available with stainless steel dual walled shielding to withstand the abrasive effect of the granular material as it rubbed against the temperature sensor. Although these temperature sensors do perform adequately, they represent an on-going maintenance requirement necessitating periodic checking and replacement thereof to ensure continuous, satisfactory pelleting. Furthermore, at lower levels of production and use of large diameter pellets, there is an opportunity for air to partially surround the probe instead of material because there is an insufficient mass of material flowing through the system. This results in some inaccuracies in temperature measurement which, if not accounted for, can detract from the ability of the control to maximize production throughput and pellet quality.

To solve these and other difficulties encountered with using direct contact temperature probes in the prior art, the inventor herein has succeeded in adapting a non-contacting, IR sensing temperature sensor to the pellet mill controllers which sense the temperature of the material and use that parameter in controlling the pellet mill. The inventor has selected a Raytec TM Thermalert II TM Model No. T2L2 which senses the infrared frequencies emanating from the material to obtain a very accurate temperature reading of the material. Replacement of the direct contact temperature sensors of the inventor's prior systems, or for that matter other systems, eliminates the problems experienced therein. Additionally, the inventor has also discovered that there are advantages to sensing the temperature of the rotating die within the mill and using that temperature in combination with the temperature of the material as it enters the mill, much as in the manner of the $\Delta T$ mill control disclosed in the '937 patent mentioned above. When the mill is first started up, the die is cold, and its temperature is unknown until pellets are formed by the die and their temperature measured. Therefore, directly sensing the temperature of the die gives a direct indication of the temperature at which the first pellets will be formed, and will also directly follow the heating up of the die as the pelleting run continues. This provides for a smoother start-up of each pelleting run, and more accurate control of the pelleting process to produce good quality pellets even at the beginning of a run.

In addition to its use in combination with a second temperature sensor to generate a $\Delta T$ measurement for use in the control analogs as disclosed in the parent application and prior patents mentioned above, the inventor has determined that the single point temperature measurement of the die can be measured and the moisture input be controlled in response to this single point temperature measurement as a new control algorithm. In most pelleting apparatus, the pellets are formed by a mixture of the material being forced through holes in the die face and then cut off by a series of blades such that the temperature of the die as the pellets are formed closely approaches that of the pellets. Generally, the mixture temperature as it is pelleted is somewhat elevated over that of the die, as the die is a large metal cylinder which radiates heat, while a continuous stream of the mixture is forced through the die such that heat from the mixture and pelleting forces are transferred to the die. Some of this additional heat is due to the frictional forces encountered in the pelleting process as the rollers force the mixture through the holes in the die face. Thus, the die serves as a large heat sink for this thermal energy and there seems to be some measurable temperature difference between the mixture temperature and the die temperature, depending upon the throughput of the pelleting apparatus. Nonetheless, the die temperature, or the temperature of pellets immediately upon their emergence from the die face, is a measurement taken at exactly the point of pellet formation, a temperature which has been found to be useful and sufficient of itself to control the pelleting process. The inventor has found that controlling this sensed die temperature, or pellet temperature immediately upon emergence from the die face, or some average therebetween, by controlling the input of moisture into the pelleting apparatus results in finished pellets which have a moisture content within a prescribed range. If pellets are being produced which have moisture content which is too high, the desired die temperature can be elevated which results in less moisture being added to the process to increase friction in the die. With less moisture, pellets having a reduced moisture content are produced and the finished pellets' moisture content is brought down. If pellets are produced having too low a moisture content, then the desired die temperature is reduced which results in increased moisture being added to decrease the frictional forces in the die thus producing finished pellets with a somewhat greater moisture content. The inventor has found that for some materials, this control algorithm provides optimum results and hence represents another mode of control in addition to $\Delta T$ and $\Delta T$ mill, as disclosed in the prior patents mentioned above.

It should be noted that although the inventor has used the control algorithm of die temperature to control the addition of moisture, it is within the range of equivalents to implement the die temperature control algorithm to control the addition of any ingredient with a significant moisture content as would be appropriate and as would have a sufficient effect upon the moisture content of the finished pellets to produce the desired results. For example, instead of controlling water input, this control algorithm could be used to control or vary the input of a wet grain at the same time that a dry grain is input to the apparatus. Thus, controlling the relative mixture between the two would also serve to control the moisture content of the mixture to be pelleted and achieve the desired results. Still other processes would achieve lubrication with materials other than moisture such as fats, oils, or the like. It is believed that this same control algorithm will serve to control those processes by controlling the amount of relative lubrication present in the mixture to be pelleted, whether that lubrication is provided by moisture or one of these other ingredients. Therefore, it is intended that these systems be included and covered as well.

To enhance the die temperature control algorithm, the inventor has added a moisture meter to measure the moisture of finished pellets after they have exited the cooler, and used the moisture meter output to automatically adjust the desired die temperature. In some processes, it has been found that the moisture content of the pellets changes as they are processed through the cooler. Of course, the moisture content of the pellet after it has cooled is the parameter most desired to be controlled. This is because tests have been conducted on finished cooled pellets to determine a prescribed moisture content to optimize pellet durability and decrease fines produced in the process. As cooling is one step in the process, its effect on the pellet should not be ignored in controlling the process to produce finished pellets having a desired or prescribed moisture content. By adding the moisture meter at the cooler to sense pellet moisture content, and automatically adjusting the desired die temperature, the effect of cooling on finished pellets can be taken into account. This represents a significant advantage over those systems known in the prior art which do not adjust the pelleting process for the effects of cooling on the moisture content of finished pellets.

Still another advantage in using a noncontacting temperature probe to measure the temperature of the die is that pellets are formed by material being forced through the holes in the die so that the temperature of the pellet as it is formed is almost exactly the same temperature as that of the die. This pellet forming temperature is one of the critical parameters to be measured and controlled to achieve uniform pellets of good quality during a pelleting run. While the direct contact temperature probe utilized in prior systems does sense the temperature of the pellets shortly after leaving the die, there is an inherent advantage in sensing the temperature of the die which is the temperature of the pellet immediately as it is formed. This thereby eliminates any error from a variation in temperature of the pellet as it moves from the die to the direct contact temperature probe in the prior art.

The foregoing has been a brief summary description of some of the principal advantages and features of the present invention. A greater understanding and appreciation for further details of the invention may be obtained by referring to the drawings and description of the preferred embodiment which follow.

DETAILED DESCRIPTION OF THE PREFERRED EMBODIMENT

Figure 1:
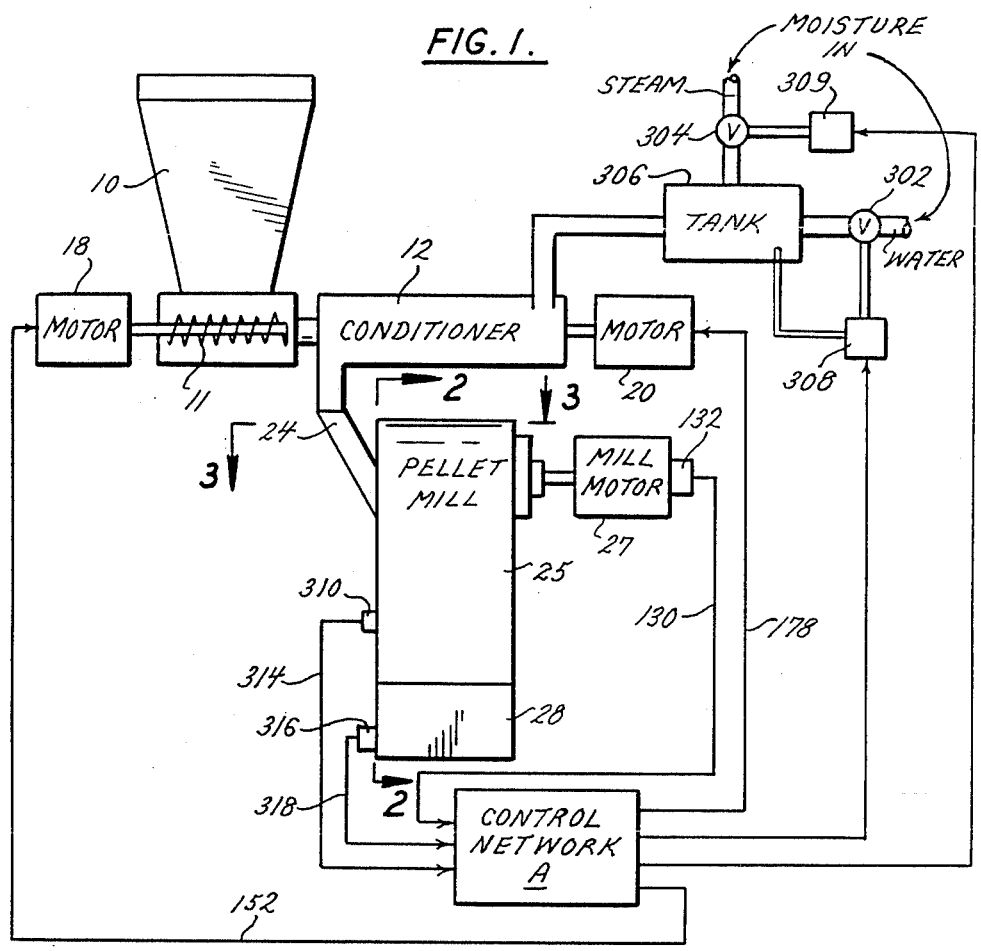
FIG. 1 is a schematic view of a control incorporating the present invention.

An automatic control for a pellet producing apparatus according to this invention is shown schematically in FIG. 1. This control includes many of the same elements as that shown in FIG. 1 of the inventor's prior U.S. Pat. No. 4,340,937, except that the temperature sensor labeled therein as 200 has been modified according to the improvement of this invention to sense the temperature of the die, the pellets immediately as they emerge from the die, or some average therebetween, temperature control has been added to the moisture input, and a moisture meter has been added to the cooler, as described below.

There is shown a bin 10 for holding a supply of material from which pellets are to be made. In the case of feed pellets, the material is preferably in milled form and is composed from any of a great variety of animal feed formulations including the numerous ones most commonly used in the art. The milled material is fed by means of an appropriate feed screw 11, auger, gravimetric feeder, or the like, into a conditioner 12. The feed screw 11 is operated, or made to rotate, by means of a variable speed screw motor 18. The conditioner includes rotating paddles or the like to agitate and add turbulence to the material as the material moves therethrough. A motor 20 operates the agitator.

From the conditioner, the material is fed down a chute 24 and into a pellet mill or pellet producing means 25. The pellet mill 25 might, for example, be of the die type and comprise a rotating cylindrical die 200 with radial holes therein and rollers mounted within the die. The material is fed into the cylinder and by interaction of the die 200 and rollers is forced through the holes in the die 200 and severed by knife 300 to form pellets. The pellet mill is operated by a relatively high horsepower electric motor 27. After severing, the pellets fall through an opening 28 at the bottom of the mill.

Means are provided for supplying one or more moisture controlling ingredients to the material within the conditioner. These ingredients might, for example, include steam, water, dry heat, or some other suitable moisture controlling ingredient. As shown in the preferred embodiment, the flow of water may be controlled by a valve 302, steam by a valve 304, and both fed into a tank 306 where they are mixed prior to being added to the mixture in conditioner 12. A motor 308 contols the relative positions of these valves to control the temperature of the moisture as it is added.

The control network A may be similar to that shown and described in the inventor's prior U.S. Pat. No. 3,932,736. The control network A has outputs 152 and 178 to the feed screw motor 18 and conditioner motor 20 for purposes as described in the patent. Also, a transducer 132 is magnetically coupled to the mill motor 27, and a signal representing the load on the motor is carried by a conductor 130 to an input of the control network A. A non-contacting temperature probe 310 is mounted in the pellet mill 25 and aligned at an acute angle to the face 312 of die 200 so that it detects the temperature of the die face 312, or pellets immediately upon their emergence from the holes in the die face 312, or an average value of these two temperatures, as desired. A conductor 314 carries this signal back to control network A for use in controlling motors 308, 309 and valves 302, 304 to either increase or decrease moisture flow into conditioner 12 in response to an increase or decrease in the sensed temperature. Additionally, a moisture meter 316 is mounted to the exit of cooler 28 to sense the moisture content of finished, cooled pellets as they emerge from cooler 28 and its output is fed through conductor 318 to control network A. Control network A automatically adjusts the desired die temperature by regulating motors 308, 309 and valves 302, 304 to raise or lower the sensed die temperature as sensed by die temperature sensor 310, if desired.

Figure 3:
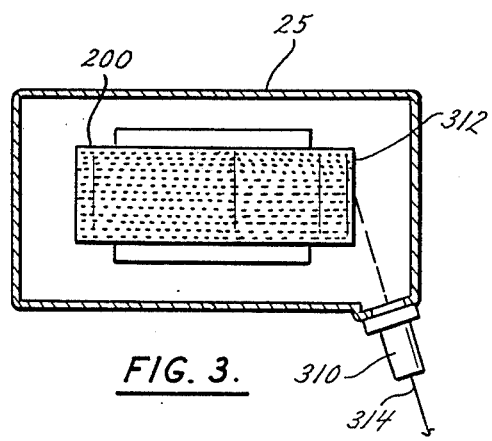
FIG. 3 is a cross-sectional view taken along the plane of line 3—3 in FIG. 1 further detailing the mounting of the temperature probe.
Figure 2:
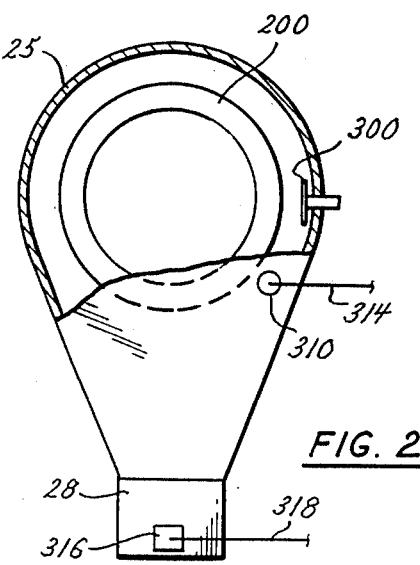
FIG. 2 is a cross-sectional view of the pellet mill, taken along the plane of line 2—2 in FIG. 1, showing the positioning of a temperature sensor according to this invention.

The sensor 310 for measuring the temperature of the die can be any temperature measuring device including thermocouples or thermistors. Preferably, however, the sensor is a non-contacting temperature sensor, such as an infrared non-contacting temperature sensor. This probe is installed at any convenient spot where infrared energy from the face of the die can reach the sensor. For optimum performance, the sensor should be aimed to sense across the outside face of the die to sense the temperature of the pellets immediately as they exit the die, as shown in FIG. 3. For example, the sensor can be mounted on the outer door of a mill on the lower right hand quadrant. The output of the sensor is an analog voltage which is fed into the control network A.

There are various changes and modifications which may be made to the invention as would be apparent to those skilled in the art. However, these changes or modifications are included in the teaching of the inventor's disclosure, and it is intended that the invention be limited only by the scope of the claims appended hereto.

I claim:

1. An automatic control system for a pelleting apparatus, the pelleting apparatus including a pellet producing means, and means for feeding a supply of a plurality of ingredients to the producing means, one of the ingredients being material and at least one other ingredient having a significant moisture content, the pellet producing means including a rotating die contained within a chamber, the die having a plurality of holes through which a mixture of said ingredients is passed to form pellets, the control system including at least one temperature sensing means, said temperature sensing means being mounted to the pellet producing means to sense the temperature of the die, and means to control the ingredient feeding means in response to said temperature sensing means.

2. The system of claim 1 wherein the control means includes means to control the addition of said significant moisture ingredient in response to said die temperature sensing means.

3. The system of claim 2 wherein the pelleting apparatus includes means to drive the pellet producing means and means to sense the load on said drive means, and the control means includes means to control the addition of the material in response to the load sensing means.

4. The system of claim 3 wherein the moisture addition control means is responsive to no temperature sensors other than the die temperature sensor.

5. The system of claim 3 further comprising means to control the temperature of the significant moisture ingredient as it is added to the pellet producing means.

6. The system of claim 1 wherein the die temperature is of a non-contacting type.

7. The system of claim 6 wherein the die temperature sensor is of an infrared sensing type.

8. The system of claim 1 wherein the die has a generally cylindrical face, the die temperature sensor being oriented to sense the temperature of the die face.

9. The system of claim 8 wherein the die temperature sensor is oriented at an acute angle to the die face.

10. An automatic control system for a pelleting apparatus, the pelleting apparatus including a pellet producing means, and means for feeding a supply of a plurality of ingredients to the producing means, one of the ingredients being material and at least one other ingredient having a significant moisture content, the pellet producing means including a rotating die contained within a chamber, the die having a generally cylindrical face with a plurality of holes therethrough through which a mixture of said ingredients is passed to form pellets, the control system including at least one temperature sensing means, said temperature sensing means being mounted to the pellet producing means to sense the temperature of the pellets immediately upon their emergence from the holes in the die face and before they are severed, and means to control the ingredient feeding means in response to said temperature sensing means.

11. The system of claim 10 wherein the control means includes means to control the addition of said significant moisture ingredient in response to said pellet temperature sensing means.

12. The system of claim 11 wherein the pelleting apparatus includes means to drive the pellet producing means and means to sense the load on said drive means, and the control means includes means to control the addition of the material in response to the load sensing means.

13. The system of claim 12 wherein the moisture addition control means is responsive to no temperature sensors other than the pellet temperature sensor.

14. The system of claim 12 further comprising means to control the temperature of the significant moisture ingredient as it is added to the pellet producing means.

15. The system of claim 12 wherein the pellet temperature sensor is of a non-contacting type.

16. The system of claim 15 wherein the pellet temperature sensor is of an infrared sensing type.

17. The system of claim 10 wherein the pellet temperature sensor is oriented at an acute angle to the die face.

18. The automatic control system for a pelleting apparatus, the pelleting apparatus including a pellet producing means, and means for feeding a supply of a plurality of ingredients to the producing means, the pellet producing means including a die through which a mixture of said ingredients is passed to form pellets, one of the ingredients being material and at least one other ingredient having a significant moisture content, the control system including only one temperature sensing means, said temperature sensing means being mounted to the pellet producing means to sense the temperature of the die, and means to control the ingredient feeding means in response to said temperature sensing means.

19. The system of claim 18 wherein the control means includes means to control the addition of said significant moisture ingredient in response to said die temperature sensing means.

20. The system of claim 19 wherein the pelleting appartus includes means to drive the pellet producing means and means to sense the load on said drive means, and the control means includes means to control the addition of the material in response to the load sensing means.

21. The system of claim 18 wherein the temperature sensor is of a non-contacting type.

22. An automatic control system for a pelleting apparatus, the pelleting apparatus including a pellet producing means, and means for feeding a supply of a plurality of ingredients to the producing means, one of the ingredients being material and at least one other ingredient having a significant moisture content, the pellet producing means including a die through which a mixture of said ingredients is passed to form pellets, the control system including a single non-contacting temperature probe to sense the temperature of the mixture as it is pelleted, and means to control the ingredient feeding means in response to no temperature sensor other than said single non-contacting temperature probe.

23. The system of claim 22 wherein the temperature probe senses the temperature of the pellets.

24. the system of claim 22 wherein the temperature probe senses the temperature of the material immediately upon its emergence from the die and before it is severed.

25. The system of claim 22 wherein the ingredient feeding control means includes means to control the addition to said significant moisture ingredient in response to said temperature probe.

26. The system of claim 25 wherein the pelleting apparatus includes means to drive the pellet producing means and means to sense the load on said drive means, and the control means includes means to control the addition of the material in response to the load sensing means.

27. An automatic control system for a pelleting apparatus, the pelleting apparatus including a pellet producing means, and means for feeding a supply of a plurality of ingredients to the producing means, one of the ingredients being material and at least one other ingredient having a significant moisture content, the pellet producing means including a die through which a mixture of said ingredients is passed to form pellets, the control system including a single non-contacting temperature probe to sense the temperature of the die as the mixture is pelleted, and means to control the ingredient feeding means in response to no temperature probe other than said single non-contacting temperature probe.

28. The system of claim 27 wherein the ingredient feeding control means includes means to control the addition of said significant moisture ingredient in response to the temperature probe.

29. The system of claim 28 wherein the die has a generally cylindrical face with a plurality of holes therethrough through which said mixture is passed to form pellets, the die temperature sensor being oriented to sense the temperature of the die face.

30. An automatic control system for a pelleting apparatus, the apparatus including a pellet producing means and means for feeding a supply of a plurality of ingredients to the producing means, one of the ingredients being material and at least one other ingredient having a significant moisture content, the pellet producing means including a rotating die contained within a chamber, the die having a plurality of holes through which a mixture of said ingredients is passed to form pellets, the automatic control system comprising means for sensing the temperature of the die, and means for automatically controlling the moisture content of the mixture at the producing means to within a prescribed range including means for controlling the ingredient feeding means to control the addition of said ingredients in response to the temperature sensing means.

31. The system of claim 30 wherein the ingredient input control means includes means to control the significant moisture ingredient in response to the temperature of the die.

32. An automatic control system for a pelleting apparatus, the apparatus including a pellet producing means and means for feeding a supply of a plurality of ingredients to the producing means, one of the ingredients being material and at least one other ingredient having a significant moisture content, the pellet producing means including a rotating die contained within a chamber, the die having a plurality of holes through which a mixture of said ingredients is passed to form pellets, the automatic control system comprising means for automatically controlling the moisture content of the mixture at the producing means to within a prescribed range including means for sensing the temperature of the material immediately upon its emergence from the holes in the die and before it is severed and means for controlling the ingredient feeding means to control the addition to said significant moisture ingredient in response thereto.

33. An automatic control system for a pelleting apparatus, the apparatus including a pellet producing means and means for feeding a supply of a plurality of ingredients to the producing means, one of the ingredients being material and at least one other ingredient having a significant moisture content, the pellet producing means including a rotating die contained within a chamber, the die having a plurality of holes through which a mixture of said ingredients is passed to form pellets, the automatic control system comprising means for automatically controlling the moisture content of the mixture at the producing means to within a prescribed range including means for sensing the temperature of the die and material immediately upon its emergence from the die holes and before it is severed with a non-contacting temperature probe and means for controlling the addition of said significant moisture ingredient in response thereto.

34. An automatic control system for a pelleting apparatus, the apparatus including a pellet producing means and means for feeding a supply of a plurality of ingredients to the producing means, one of the ingredients being material and at least one other ingredient having a significant moisture content, the pellet producing means including a rotating die contained within a chamber, the die having a plurality of holes through which a mixture of said ingredients is passed to form pellets, the automatic control system comprising means for automatically controlling the moisture content of the mixture at the producing means to within a prescribed range including means for sensing the temperature of the mixture as it emerges through the holes in said die and before it is severed with a non-contacting temperature probe and means for controlling the addition of said ingredients in response thereto.

35. The system of claim 34 wherein the ingredient input control includes means to control the addition of said significant moisture ingredient alone in response to the temperature sensing means.

36. The system of claim 35 wherein the automatic control system is responsive to the non-contacting temperature sensing means, and no others.

37. An automatic control system for a pelleting apparatus, the pelleting apparatus including a pellet producing means and means for feeding a supply of a plurality of ingredients to the producing means, one of the ingredients being material and at least one other ingredient having a significant moisture content, the pellet producing means including a rotating die contained within a chamber, the die having a plurality of holes through which a mixture of said ingredients is passed to form pellets, the automatic control system comprising means for controlling the moisture content of the pellets to within a prescribed range comprising means for determining a desired die temperature, means for sensing die temperature, and means for controlling the addition of said significant moisture ingredient in response to said die temperature sensing means to thereby control die temperature.

38. The system of claim 37 wherein the pelleting apparatus further comprises means to cool the pellets, means to sense the moisture content of said cooled pellets, and means for automatically adjusting the desired die temperature in response to said pellet moisture sensing means.

39. An automatic control system for a pelleting apparatus, the pelleting apparatus including a pellet producing means and means for feeding a supply of a plurality of ingredients to the producing means, one of the ingredients being material and at least one other ingredient having a significant moisture content, the pellet producing means including a rotating die contained within a chamber, the die having a plurality of holes through which a mixture of said ingredients is passed to form pellets, the automatic control system comprising means for controlling the moisture content of the pellets to within a prescribed range comprising means for determining a desired pellet temperature, means for sensing the temperature of the pellets immediately upon their emergence from the die holes and before they are severed, and means for controlling the addition of said significant moisture ingredient in response to said pellet temperature sensing means to thereby control pellet temperature.

40. The system of claim 39 wherein the temperature sensing means comprises a non-contacting temperature sensor.

41. The system of claim 39 further comprising means to cool the pellets, means to sense the moisture content of the cooled pellets, and means to automatically adjust the desired pellet temperature in response to said pellet moisture sensing means.

42. An automatic control system for a pelleting apparatus, the pelleting apparatus including a pellet producing means and means for feeding a supply of a plurality of ingredients to the producing means, one of the ingredients being material and at least one other ingredient having a significant moisture content, the pellet producing means including a rotating die contained within a chamber, the die having a plurality of holes through which a mixture of said ingredients is passed to form pellets, the automatic control system comprising means for controlling the moisture content of the pellets to within a prescribed range comprising means for determining a desired mixture temperature, means for sensing the temperature of the mixture as it emerges through said die holes with a non-contacting temperature probe, and means for controlling the addition of said significant moisture ingredient in response to said temperature sensing means to thereby control mixture temperature.

43. The system of claim 42 further comprising means to cool the pellets, means to sense the moisture content of the cooled pellets, and means to automatically adjust the desired mixture temperature in response to said pellet moisture sensing means.

44. A method for producing pellets having a moisture content within a prescribed range with a pelleting apparatus, the pelleting apparatus including a pellet producing means, and means for feeding a supply of a plurality of ingredients to the producing means, one of the ingredients being material and at least one other ingredient having a significant moisture content, the pellet producing means including a rotating die contained within a chamber, the die having a plurality of holes through which a mixture of said ingredients is passed to form pellets, the method comprising the steps of sensing the temperature of the die, and controlling the ingredient feeding means to control the addition of moisture to the pelleting apparatus in response to the die temperature sensor.

45. The method of claim 44 wherein the pelleting apparatus further includes means to cool the pellets, and further comprising the steps of sensing the moisture content of the cooled pellets, determining a desired die temperature, and automatically adjusting the desired die temperature in response to the pellet moisture sensing means.

46. The method of claim 45 further comprising the step of controlling the temperature of the moisture added to the pelleting apparatus.

47. The method of claim 46 wherein the step of sensing the die temperature includes sensing the die temperature without physically contacting the die.

48. The method of claim 47 wherein the pelleting apparatus further comprises means to drive the pellet producing means, and further comprising the steps of sensing the load on the drive means, and controlling the ingredient feeding means to control the addition of material to the pelleting apparatus in reponse to the drive load.

49. A method for producing pellets having a moisture content within a prescribed range with a pelleting apparatus, the pelleting apparatus including a pellet producing means, and means for feeding a supply of a plurality of ingredients to the producing means, one of the ingredients being material and at least one other ingredient having a significant moisture content, the pellet producing means including a rotating die contained within a chamber, the die having a plurality of holes through which a mixture of said ingredients is passed to form pellets, the method comprising the steps of sensing the temperature of the pellets immediately upon their emergence from the die holes and before they are severed, and controlling the ingredient feeding means to control the addition of moisture to the pelleting apparatus in response to the pellet temperature.

50. The method of claim 49 wherein the pelleting apparatus further includes means to cool the pellets, and further comprising the steps of sensing the moisture content of the cooled pellets, determining a desired pellet temperature, and automatically adjusting the desired pellet temperature in response to the pellet moisture sensing means.

51. The method of claim 50 further comprising the step of controlling the temperature of the moisture added to the pelleting apparatus.

52. The method of claim 51 wherein the step of sensing the pellet temperature includes sensing the pellet temperature without physically contacting the pellets.

53. The method of claim 52 wherein the pelleting apparatus further comprises means to drive the pellet producing means, and further comprising the steps of sensing the load on the drive means, and controlling the ingredient feeding means to control the addition of material to the pelleting apparatus in response to the drive load.

54. A method for producing pellets having a moisture content within a prescribed range with a pelleting apparatus, the pelleting apparatus including a pellet producing means, and means for feeding a supply of a plurality of ingredients to the producing means, one of the ingredients being material and at least one other ingredient having a significant moisture content, the pellet producing means including a rotating die contained within a chamber, the die having a plurality of holes through which a mixture of said ingredients is passed to form pellets, the method comprising the steps of sensing the temperature of the mixture as it emerges through the die holes with a non-contacting temperature probe, and controlling the ingredient feeding means to control the addition of moisture to the pelleting apparatus in response to the mixture temperature.

55. The method of claim 54 wherein the pelleting apparatus further includes means to cool the pellets, and further comprising the steps of sensing the moisture content of the cooled pellets, determining a desired mixture temperature, and automatically adjusting the desired mixture temperature in response to the pellet moisture sensing means.

56. The method of claim 55 further comprising the step of controlling the temperature of the moisture added to the pelleting apparatus.

57. The method of claim 56 wherein the step of sensing the mixture temperature includes sensing the mixture temperature without physically contacting the mixture.

58. The method of claim 57 wherein the pelleting apparatus further comprises means to drive the pellet producing means, and further comprising the steps of sensing the load on the drive means, and controlling the ingredient feeding means to control the addition of material to the pelleting apparatus in response to the drive load.

59. A pelleting apparatus for producing pellets having a moisture content within a prescribed range, the pelleting apparatus including a pellet producing means, and means for feeding a supply of a plurality of ingredients to the producing means, one of the ingredients being material and at least one other ingredient having a significant moisture content, the pellet producing means including a die through which a mixture of said ingredients is passed to form pellets, and a control system for controlling the operation of the pelleting apparatus, said control system comprising a single non-contacting temperature sensing means, said temperature sensing means being mounted to the pellet producing means to sense the temperature of the die, and means to control the ingredient feeding means to control the addition of said significant moisture ingredient in response to no temperature sensing means other than the die temperature sensing means.

60. The pelleting apparatus of claim 59 further comprising means to drive the pellet producing means, and wherein the control system includes means to sense the load on the drive means, and means to control the ingredient feeding means to control the addition of material in response to the sensed load.

61. The pelleting apparatus of claim 59 further comprising means to cool the pellets, and wherein the control system further comprises means to measure the moisture content of the cooled pellets, means to determine a desired die temperature, and means to automatically adjust the desired die temperature in response to the pellet moisture sensing means.

62. The pelleting apparatus of claim 61 further comprising means to change the temperature of the moisture ingredient, and wherein the control system further comprises means to control the moisture ingredient temperature changing means.

63. An automatic control system for a pelleting apparatus, the pelleting apparatus including a pellet producing means, means for feeding a supply of a plurality of ingredients to the producing means, one of the ingredients being material and at least one other ingredient having a significant moisture content, and means to cool the pellets, the pellet producing means including a rotating die contained within a chamber, the die having a plurality of holes through which a mixture of said ingredients is passed to form pellets, the control system including means to sense the moisture content of said cooled pellets, and means for automatically adjusting the operation of said pelleting apparatus in resposne to said cooled pellet moisture sensing means.

64. The system of claim 63 wherein the control system includes means to control the addition of moisture, the moisture addition control means being responsive to the pellet moisture sensing means.

65. The system of claim 64 wherein the control system includes means to produce cooled pellets having a moisture content within a prescribed range.

66. The system of claim 65 wherein the control system includes means to sense the temperature of the mixture at least at one position in the pelleting apparatus, and means to control said temperature by controlling the addition of one or more of said ingredients.

67. The system of claim 66 wherein the system has means to sense the temperature of the mixture at two positions in the pelleting apparatus.

68. The system of claim 65 wherein the system has means to sense the temperature of the die, and means to control the addition of one or more of the ingredients to control the temperature of the die.

69. The system of claim 65 wherein the system has means to sense the temperature of the pellets immediately upon their emergence from the die, and means to control the pellet temperature by controlling the addition of one or more of the ingredients.

* * * * *